United States Patent
Oz et al.

(10) Patent No.: US 7,237,251 B1
(45) Date of Patent: Jun. 26, 2007

(54) METHOD AND APPARATUS FOR USING DELAY TIME DURING SWITCHING EVENTS TO DISPLAY PREVIOUSLY STORED INFORMATION ELEMENTS

(75) Inventors: Ran Oz, Modiin (IL); Amir Bassan-Eskenazi, San Mateo, CA (US)

(73) Assignee: Bigband Networks, Inc., Redwood City, CA (US)

( * ) Notice: Subject to any disclaimer, the term of this patent is extended or adjusted under 35 U.S.C. 154(b) by 0 days.

(21) Appl. No.: 09/517,818

(22) Filed: Mar. 2, 2000

Related U.S. Application Data

(60) Provisional application No. 60/122,437, filed on Mar. 2, 1999.

(51) Int. Cl.
*H04N 5/445* (2006.01)
*H04N 7/173* (2006.01)
(52) U.S. Cl. .............. 725/40; 725/46; 725/91; 725/100; 725/131
(58) Field of Classification Search .......... 725/32, 725/34, 33, 86–88, 131, 139, 151, 112, 113, 725/35, 40, 46, 91, 93, 100; 348/731; 709/231, 709/220, 228, 227, 232
See application file for complete search history.

(56) References Cited

U.S. PATENT DOCUMENTS 5,572,643 A * 11/1996 Judson ................. 709/218
5,781,227 A * 7/1998 Goode et al. ............ 725/32

(Continued)

FOREIGN PATENT DOCUMENTS

EP 0634871 A2 6/1994

(Continued)

OTHER PUBLICATIONS

PCT—International Search Report—PCT/US 00/14716, May 25, 2000.

*Primary Examiner*—Kieu-Oanh Bui
(74) *Attorney, Agent, or Firm*—Sonnenschein, Nath & Rosenthal LLP

(57) ABSTRACT

During the several seconds of delay time that it takes for a digital set top box ("STB") that is connected to a television or other display device to switch channels and display the next target program, other information or data can be displayed to a viewer of the television. This other data ("zap page") can include, for example, advertising, information about the next/target program, a window showing a segment of the next/target program that is transmitted over the next/target channel, personal information associated with the viewer (e.g., notification that one or more electronic mail messages have arrived, stock prices of securities in the viewer's portfolio, etc.) and potentially based on the viewer's profile (e.g., recipes for cooking enthusiasts, news clips from preferred sources, advertisements of particular interest, etc.), and/or local and regional information (e.g., weather forecasts, etc.). The zap page also can include interactive elements that enable one-way and two-way transactions with the viewer. The zap page is pre-rendered and stored within the digital STB so that when the viewer requests a switch in channels, the zap page is displayed substantially immediately. The zap page is displayed until the channel switch has been completed and the next/target program is displayed. However, if the viewer engages in an interactive session, the display of the next/target channel is suspended until the viewer disengages the interactive session.

22 Claims, 5 Drawing Sheets

U.S. PATENT DOCUMENTS

| | | | |
|---|---|---|---|
| 5,786,845 A * | 7/1998 | Tsuria | 725/32 |
| 5,838,314 A * | 11/1998 | Neel et al. | 725/8 |
| 5,892,508 A * | 4/1999 | Howe et al. | 725/131 |
| 5,907,321 A * | 5/1999 | Grossman et al. | 725/32 |
| 6,005,561 A * | 12/1999 | Hawkins et al. | 715/500.1 |
| 6,029,045 A * | 2/2000 | Picco et al. | 725/34 |
| 6,094,677 A * | 7/2000 | Capek et al. | 709/219 |
| 6,169,542 B1 * | 1/2001 | Hooks et al. | 345/719 |
| 6,182,126 B1 * | 1/2001 | Nathan et al. | 725/134 |
| 6,199,106 B1 * | 3/2001 | Shaw et al. | 709/217 |
| 6,282,713 B1 * | 8/2001 | Kitsukawa et al. | 725/36 |
| 6,340,987 B1 * | 1/2002 | Hayashi | 348/14.01 |
| 6,615,251 B1 * | 9/2003 | Klug et al. | 709/218 |
| 6,698,020 B1 * | 2/2004 | Zigmond et al. | 725/34 |

FOREIGN PATENT DOCUMENTS

| | | |
|---|---|---|
| WO | WO 99/00984 | 1/1999 |

* cited by examiner

METHOD AND APPARATUS FOR USING DELAY TIME DURING SWITCHING EVENTS TO DISPLAY PREVIOUSLY STORED INFORMATION ELEMENTS

CROSS-REFERENCE TO RELATED CASE

This claims priority to and the benefit of U.S. provisional patent application Ser. No. 60/122,437, filed on Mar. 2, 1999.

TECHNICAL FIELD

The invention relates generally to displaying information on a screen. More particularly, the invention relates to displaying information during a period of delay when switching between channels.

BACKGROUND INFORMATION

Television broadcasters and transport companies, such as cable companies or Digital Broadcast Satellite (DBS) companies, transmit media streams to a customer's receiver for subsequent display on a display screen of, for example, a television. The receiver typically is separate from, but coupled to, the television or other device having the display screen. The receiver can be capable of receiving media streams containing compressed digital programs in the MPEG-2 format, and such a receiver typically is referred to as a digital set-top box (STB). In general, a system supporting the transmission and reception of digital media streams includes a server computer (located, for example, at a cable headend) and "thin-client" that runs software on a customer's digital STB. The server and the digital STB typically communicate via a two-way network, but they also can communicate to a limited extent via a one-way network.

SUMMARY OF THE INVENTION

The use of a digital STB introduces at least a one to two second delay time when a customer switches from one channel to another, and this delay time is due to channel tuning time, MPEG transport parsing initialization, and MPEG program internal structure. The delay time occurs, for example, when a viewer specifies a new channel number or presses the up/down arrows on a remote control coupled to the digital STB. There also is a delay associated with the thin-client displaying an electronic program guide in response to a customer or viewer request for the guide. The guide enables the viewer to view information on the various programs available on the various channels before selecting a preferred program. Although any delay time is typically in the order of one to two seconds, it can increase when a new program is added to a channel by the cable headend, such that a two to four second delay occurs. Basically, it takes a few seconds for a decoder in the digital STB to process a new media stream before displaying the multimedia presentation contained within the stream. These types of digital STB-related or digital STB-introduced delays generally are referred to hereinafter as "zap time." During zap time, the viewer sees small squares (blocks) of the target video program being overlaid on top of the prior video program on the screen, until the prior video program is fully replaced with the target video program.

The invention relates to methods and systems for displaying data to the viewer during zap time. This displayed data can include, for example, one or more of the following: advertising; information about the next/target program or channel selected; a window showing a segment of the target program that is transmitted over the target channel; personal information associated with the viewer (e.g., notification that one or more electronic mail messages have arrived, stock prices of securities in the viewer's portfolio, etc.) and/or based on the viewer's profile (e.g., recipes for cooking enthusiasts, news clips from preferred sources, advertisements of particular interest, etc.); and local and regional information (e.g., weather forecasts, etc.). The displayed data also can include interactive elements that allow the viewer to request additional data for display on the screen. In addition, the interactive elements can correspond to a one-way transaction, such as when modifying the viewer's profile to block certain types of data. The data displayed during zap time generally is referred to hereinafter as a "zap page."

The zap page is pre-rendered and stored within the memory and/or buffer of the digital STB. When the viewer requests a switch in channels, such as by selecting a channel number or pressing a channel selection arrow on a remote control, the zap page is displayed substantially immediately. The zap page is displayed until the channel switch has been completed and then the target program is displayed in place of the zap page. However, if the viewer engages in or is engaged in an interactive session related to one or more interactive elements displayed on the zap page, the display of the target program is suspended until the viewer disengages the interactive session by sending a resume signal to the digital STB (such as by pressing a certain button on the remote control).

In one embodiment, a server periodically multicasts zap page contents to a plurality of viewers. A receiver, such as a digital STB, selects one of the plurality of zap pages and stores it in the buffer of the digital STB until a zap event is received that triggers the transmission and display of that zap page on the screen. The digital STB can also select and store one or more of the plurality of zap pages in the buffer and/or other memory of the digital STB so that when the "current" zap page stored in the buffer is displayed, one of the other zap pages can be transferred to the buffer in preparation for future transmission and display on the screen. Executable code stored within the memory of the digital STB and executed by a processor in the digital STB controls the selection, storage, and display of the zap page. When selecting one of the plurality of zap pages transmitted by the server, the executable code can select the first zap page received after a prior zap page has been displayed or it can select the zap page based on viewer profile information that it has gathered or that has been provided by the server. Alternatively, the server can narrow cast zap pages of a particular type to an individual viewer based on that viewer's profile information. The profile information can be obtained from the digital STB, assimilated by the server itself, and/or this profile information can be accessed from another data source such as a database accessible via the Internet or other communications network.

When the viewer engages in an interactive session, the additional data can be obtained from local storage or memory located in, or associated with, the digital STB or it can be obtained from the server. If the transaction requested in the interactive session requires an interface with an external transaction provider, the digital STB can transmit the request to the server for further processing. The server would then service this request by obtaining the data from the appropriate transaction provider and subsequently forwarding it back to the digital STB for display on the screen.

Although aspects of this invention are, at least in part, related to cable television systems (and, more particularly, to digital cable television systems), the invention can be applied to other types of broadcasting and transport systems (e.g., digital broadcast satellites, telephone systems, etc.). Aspects of this invention can also be applied to packet networks such as the Internet. For example, zap page content can be displayed in a web browser during the delay period between requesting an HTML page and receiving that HTML page. Zap page content can also be displayed during the delay period between launching the execution of a software application (such as a compute intensive or graphic-rendering application) and receiving the output/results of that launched software application.

In one aspect, the invention features a method of displaying data. The method comprises storing a first data set, such as a zap page. The method further comprises receiving a request to display a second data set, such as when a digital STB receives a signal from a remote control device to switch channels and display another program. The method further comprises receiving the requested second data set, which can then be transmitted to a display device. The method also comprises transmitting the first data set (to, for example, the display device) during a delay period between receiving the request and receiving the second data set.

In another aspect, the invention relates to a system for displaying data. The system includes a buffer, an input element, a network interface, a display device, memory storing executable code, and a processor. The buffer stores a first data set, such as a pre-rendered zap page. The input element receives a request for a second data set, such as when a digital STB receives a signal from a remote control device to display a program on another channel. The network interface receives the second data set from, for example, a server at a cable headend. The display interface transmits data to a display device, such as a television screen. The memory stores the executable code that, for example, monitors and/or controls at least part of the operation of the system. The processor executes the executable code in response to the request received by the input element. The executable code instructs the display interface to transmit the first data set in the buffer to the display device during a delay period between receiving the request and receiving the second data set.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
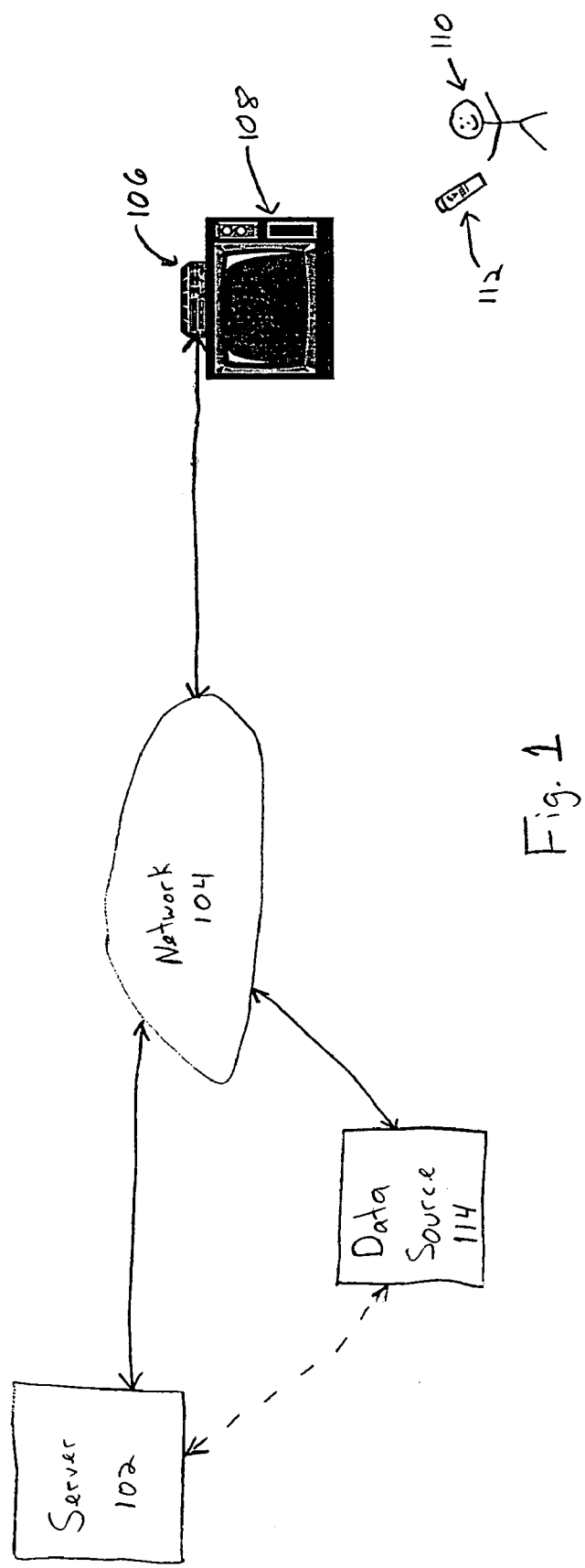
FIG. 1 illustrates an external environment to which a digital set-top box (STB) communicates, in accordance with the invention.

Referring to FIG. 1, the elements supporting the operation of the invention include a server 102, a data source 114, a network 104, a receiver 106, a display device 108, an input device 112, and a viewer 110 (a person or multiple people) of the display device 108. The server 102 can comprise a plurality of server computers as well as the software operating therein to provide, for example, video on demand, music on demand, interactive MPEG, Internet access, telephony gateways, transaction processing, viewer profiling, selection/formation of zap page contents, etc. In performing these functions, the server 102 can access the data source 114 to obtain the desired data when necessary.

In one embodiment, the data source 114 corresponds to a data repository located on a local hard disk drive or other direct access storage device. In another embodiment, the data source 114, corresponds to a database or transaction processing system that is accessible to the server 102 via the network 104. The network 104 can comprise a single network type or a combination of a plurality of network types, such as the Internet, intranet, telephone system, satellite transmission, cable, fiber optic, etc. The network 104 can also support multiple protocol and interface types.

Also coupled to the server 102 via the network 104 is the receiver 106, such as a digital STB that communicates with the server 102 and displays data provided therefrom on the display device 108 (e.g., television screen, computer screen, etc.). This displayed data is then perceived by the viewer 110 who interacts with the receiver 106 using the input device 112, such as a remote control device, to affect the displayed data.

In order to facilitate the description of the invention, but without any loss in generality, this document will hereinafter disclose embodiments of the invention as they relate to cable television (TV) systems. Therefore, the viewer 110 views programs selected with the remote control device 112 on the TV screen 108. The program displayed on the TV screen 108 is rendered and displayed by the digital STB 106 that received the program data as a media stream from the video/audio server 102 via the hybrid fiberoptic/cable network 104. Elements of the media stream can include data provided by the data source 114 which is serving as a transaction processor on a web server coupled to the server 102 via the Internet.

Figure 2:
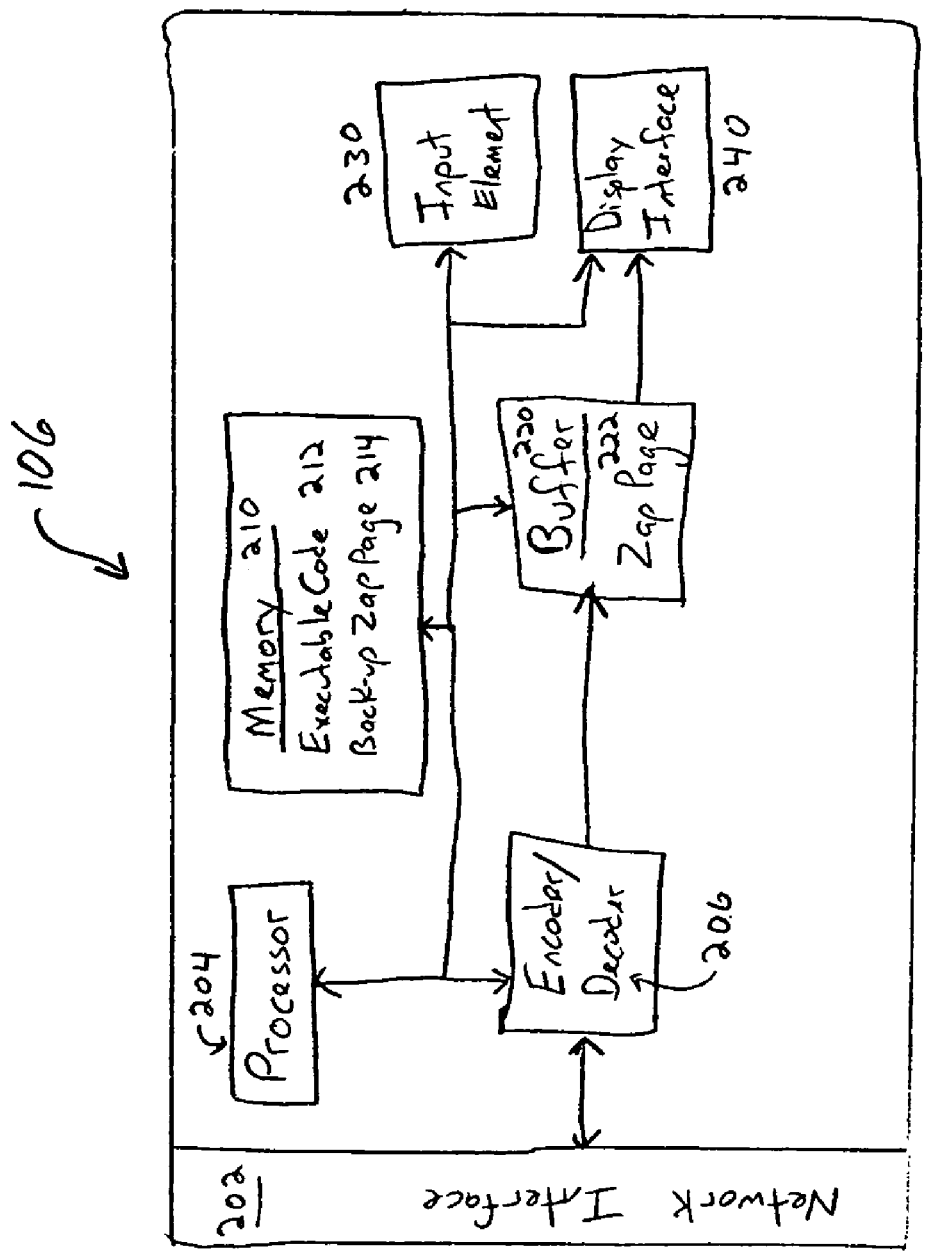
FIG. 2 is a block diagram of internal components of the digital STB shown in FIG. 1.

In one embodiment and with reference to FIGS. 1 and 2, the server 102 transmits media streams comprising compressed digital programs and other data encoded in the MPEG-2 format to the digital STB 106 of the viewer 110. The media stream is transmitted in a 6 MHz channel as a multi-program transport stream (MPTS) that contains a plurality of digital MPEG programs. When the viewer 110 selects a program to view on a particular channel via the remote control device 112, the remote control device 112 transmits a signal to an input element 230 of the digital STB 106. A processor 204 of the digital STB 106 executes an executable code 212 in a memory 210 of the digital STB 106 to tune a network interface 202 of the digital STB 106 to the desired 6 MHz channel. The network interface 202 of the digital STB 106 subsequently receives the media stream and obtains the desired digital program by parsing a specific single-program transport stream ("SPTS") from the MPTS. The SPTS corresponding to the desired program is then decoded by audio/video decoders 206 of the digital STB 106, rendered and subsequently displayed on the TV screen 108 via a display interface 240.

The delay time associated with channel tuning, MPTS parsing, and rendering accounts for much of the zap time (1–2 seconds) when switching channels. In some instances, where the desired program is not contained in the MPTS, the zap time increases (2–4 seconds) to accommodate the additional delay of informing the server 102 that a program is not available in the MPTS of the selected channel and for the server 102 to embed the SPTS associated with that program into the MPTS of the selected channel.

The invention uses the zap time introduced when switching channels to display a zap page 222 on the TV screen 108 of the viewer 110. Prior to receiving the channel-switch signal from the remote control device 112 at the input element 230, the zap page 222 is stored in a pre-rendered form (at least in part) in a frame buffer 220 of the digital STB 106. In response to the channel-switch signal or other zap event, the processor 204 executes the executable code 212 in memory 210 to transmit the zap page 222 in the buffer 220 to the display interface 240 for subsequent display on the TV screen 108. Once the zap page 222 has been transmitted, the executable code 212 renders a back-up zap page 214 previously stored in the memory 210 and moves the newly-rendered, back-up zap page into the buffer 220 to await the arrival of a future zap event.

Figure 3:
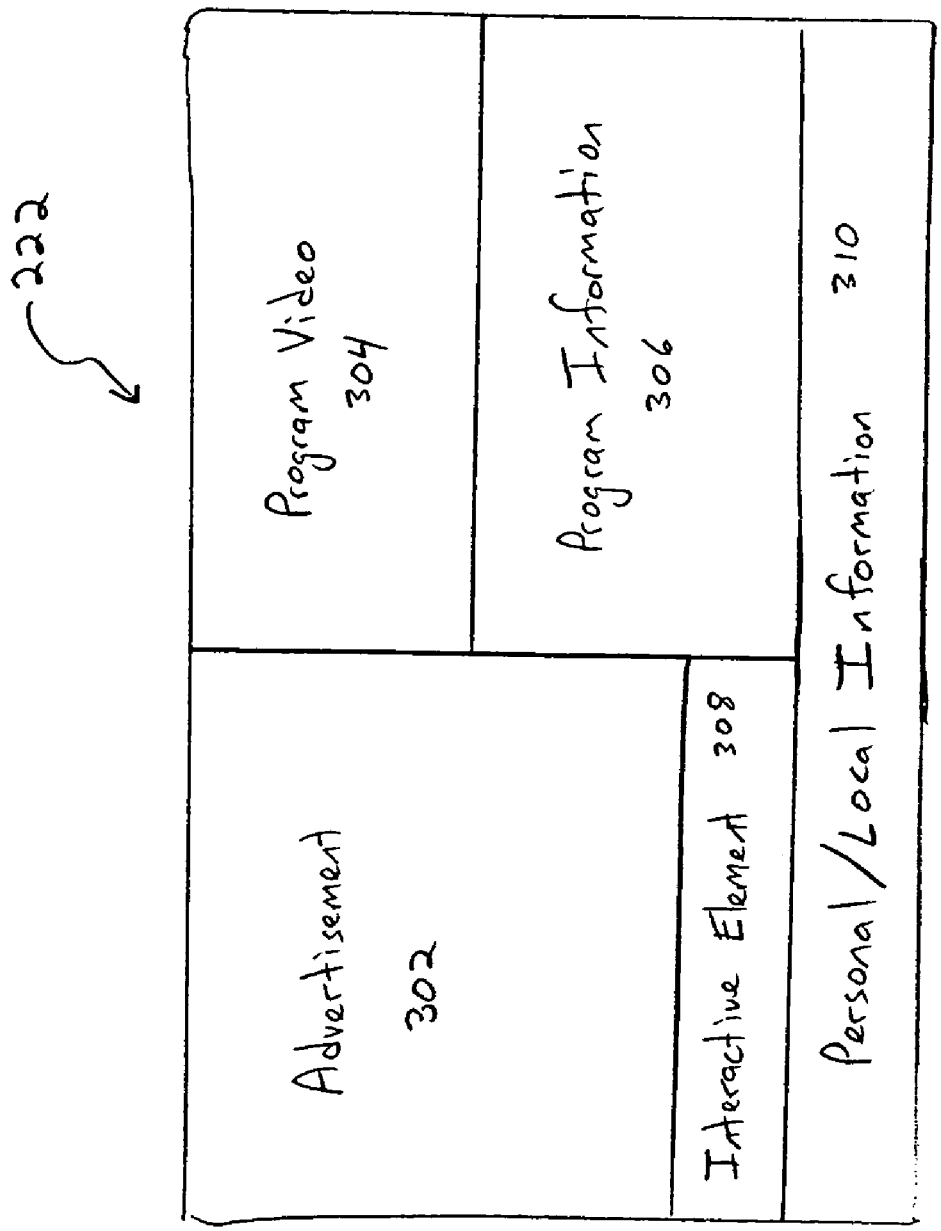
FIG. 3 shows an example of a zap page that can be displayed on a display device, in accordance with the invention.

Referring to FIG. 3, the zap page 222 displayed on the TV screen 108 in response to a zap event can comprise advertisement data 302, information about the target program 306 (e.g., its duration, actors, etc.), a window displaying the video of the target program 304 (such as may occur when the target program is available for display but has been temporarily suspended due to interactions with the zap page 222), an interactive element 308, and personal/local information 310. The zap page 222 is displayed on the TV screen 108, until the next/target program is ready for display, at which time, the target program moves to the foreground of the TV screen 108. However, display of the target program is suspended when the viewer 110 enters into an interactive session with the zap page 222. In any event, the viewer 110 can terminate the display of the zap page 222 at any time by pressing a button on the remote control device 112 that is perceived by the executable code 212 of the digital STB 106 as a zap termination event. When a zap termination event is received, the digital STB 106 displays the target program on the TV screen 108 even if it had been previously suspended.

The advertisement data 302 embedded in a particular zap page 222, can be determined in accordance with profile information gathered for the viewer 110. The profile information can be based on the viewer's prior TV viewing habits, prior purchasing habits, etc. The viewer's profile information can also be gathered by monitoring the viewer's activities and recording this data at the digital STB 106 or at the server 102. Alternatively or in combination, the server 102 can access the viewer's profile information from the data source 114. For example, the data source 114 may contain the viewer's historical buying habits, usage rate of certain services, etc.

The interactive element 308 of the zap page 222 enables the viewer to interact with the zap page 222 to obtain additional information about objects displayed on the zap page 222 or to perform other actions related to these objects. For example, if the viewer 110 is viewing a product-related advertisement 302, the viewer may want to obtain the color options available for that product. The viewer 110 transmits a signal to the digital STB 106 using the remote control device 112 to request such data. The data request, performed while the zap page is being displayed, is referred to hereafter as a zap page request. The zap page request is received by the input element 230 and processed by the processor 204 and executable code 212. In this example, the executable code 212 may search the memory 210 or buffer 220 for the desired information.

If the information is not stored locally within the digital STB 106, the executable code 212 formulates a query that is transmitted by the network interface 202 to the server 102. The server 102, upon receipt of the query, accesses its internal data sources or external databases, web sites, etc. of the data source 114. Once the information is obtained, it is transmitted back to the requesting digital STB 106. The data source 114 can also provide access to a transaction processor hosted on a web server for placing orders, obtaining brochures, etc. In this manner, the viewer 110 can establish an interactive session with the remote data source 114 relating to interactive elements 308 available on the zap page 222.

While the viewer 110 is engaged in this interactive session, the display of the next/target program is suspended until the viewer 110 transmits a resume signal via the remote control device 112. The input element 230 of the digital STB 106 informs the executable code 212 that the resume signal has arrived, and the executable code 212 instructs the display interface 240 to move the next/target program to the foreground of the TV screen 108.

The personal/local information 310 displayed on the zap page 222 can also be based on the viewer's profile information and can be obtained from the digital STB 106, server 102 and/or data source 114. Examples of personal/local information include late-breaking news stories, weather information, political information, current stock prices of securities held in the viewer's investment portfolio, arrival of electronic mail in the inbox of the viewer's email account, etc.

Figure 4:
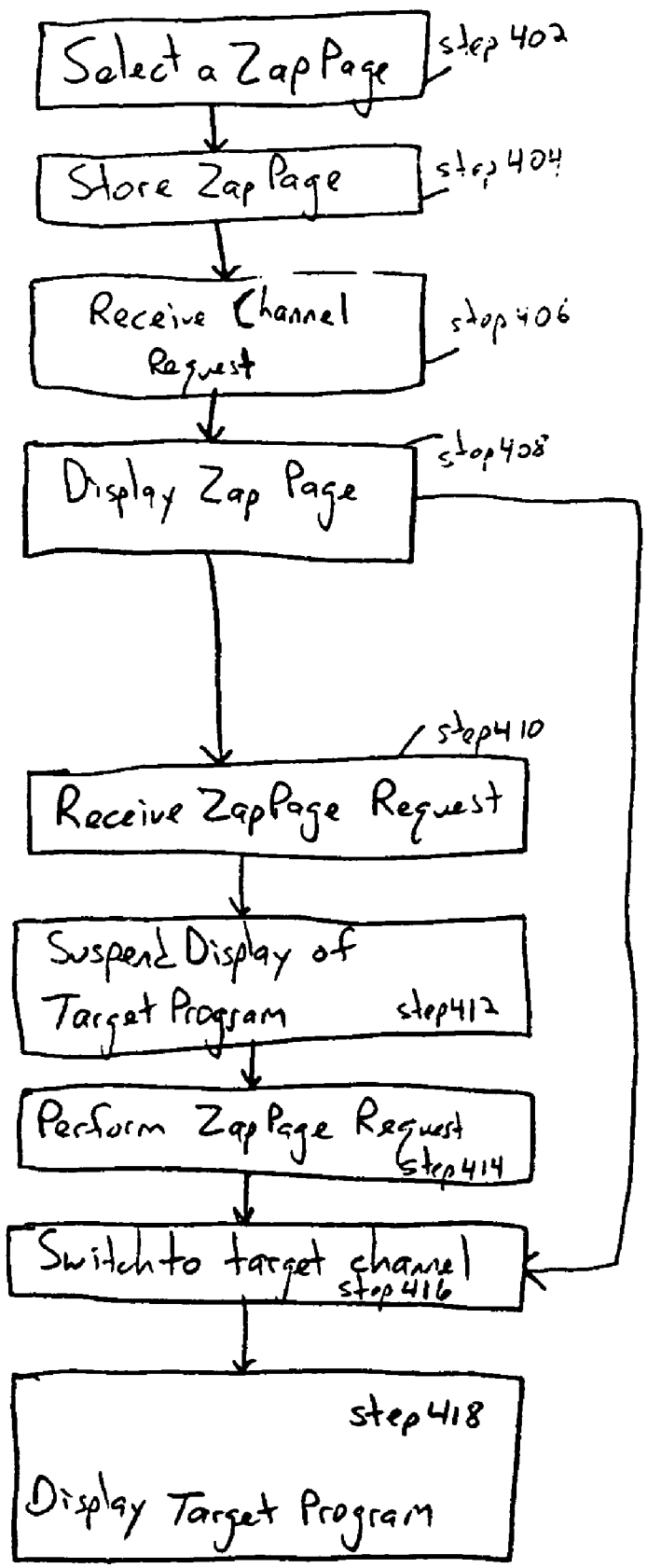
FIG. 4 is a flow diagram of a process that displays a zap page during a delay period or zap time, in accordance with the invention.

Referring to FIGS. 1, 2, and 4, the server 102 periodically transmits a plurality of zap page contents to the digital STB 106. The zap page contents can be formulated and multicast by the server 102 to a plurality of end users or the zap page contents can be tailored and narrow cast to a particular viewer 110 based on that viewer's profile. When the executable code 212 determines that the zap page 222 in the buffer 220 has already or is currently being displayed on the TV screen 108 and that the back-up zap page 214 has been moved from the memory 210 and stored in a rendered form in the buffer 220 and a new back-up zap page is therefore needed, the executable code 212 selects one of the plurality of zap pages (step 402) received at the network interface 202 of the digital STB 106 Once the zap page contents (that are in HTML format, for example) are selected (step 402), the executable code 212 stores the zap page contents (step 404) in the memory 210 of the digital STB 106.

At some point, the viewer 110 transmits a signal to the input element 230 of the digital STB 106 indicative of the viewer's desire to switch channels. The input element 230 receives this channel-switch request (step 406) and informs the executable code 212 of this zap event. The executable code 212 instructs the display interface 240 to display the zap page 222 on the TV screen 108 (step 408) by moving the zap page 222 to the foreground of the TV screen 108. Assuming that the viewer 110 does not interact with the displayed zap page, the digital STB 106 completes its channel switching process to the target channel (step 416) and the program on the target channel is subsequently displayed on the TV screen 108 (step 418).

Alternatively, if the viewer 110 interacts with the displayed zap page 222, the input element 230 receives the zap page request (step 410) and informs the executable code 212 of its receipt. The executable code 212 continues with the switching process of the digital STB 106 but suspends the display of the target program (step 412). The executable code 212 then performs the zap page request (step 414) as previously discussed. When the zap page request has been fulfilled and/or a zap termination event is received by the digital STB 106, the switching process of the digital STB is completed for the target channel (step 416) and the target program is displayed (step 418) by bringing it to the foreground of the TV screen 108.

Figure 5:
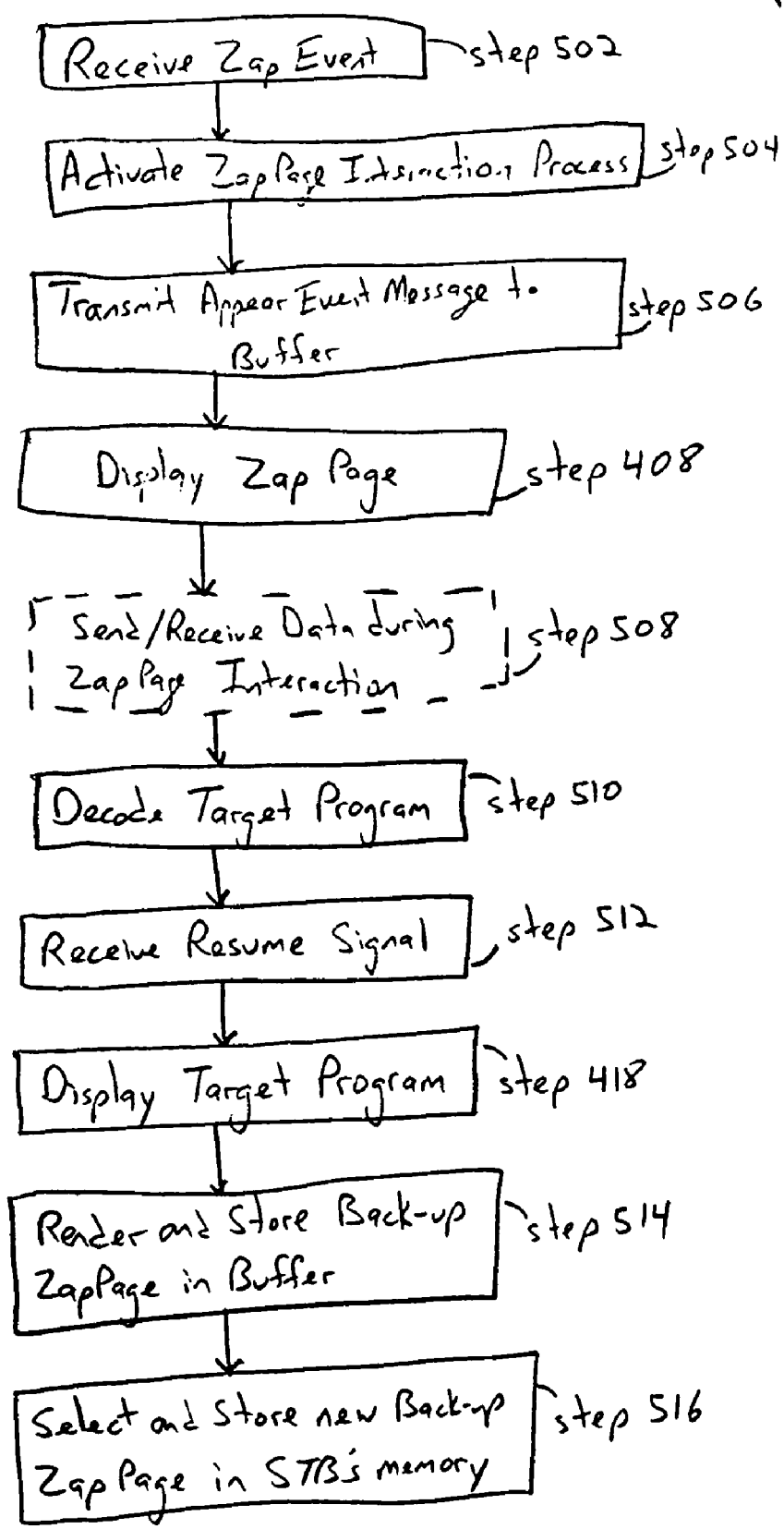
FIG. 5 is a more detailed process flow diagram than the diagram of FIG. 4.

More particularly and with reference to FIGS. 2 and 5, when the input element 230 receives a zap event (step 502) and reports its receipt to the executable code 212, the executable code 212 activates a zap page interaction process (step 504). The zap page interaction process can correspond to a process that is activated when the processor 204 executes the executable code 212 or it can correspond to a process separate from that of the executable code 212 that is activated when a zap event is received (step 502). Once the zap page interaction process has been instantiated, it transmits an appear event message to the buffer 220 (step 506) indicating that the pre-rendered zap page 222 must be transmitted to the display interface 240 and subsequently displayed on the TV screen 108 (step 408).

If the viewer 110 interacts with the zap page 222 that is displayed on the TV screen 108, the zap page interaction process sends and receives data to/from the server 102 as necessary to process the zap page request (step 508). Regardless of whether or not an interactive session has been established, the digital STB 106 will continue its channel switching process and decode the target program (step 510) with its decoder 206. However, if an interactive session was established, the zap page interaction process waits until a resume signal is received from the viewer 110 (step 512) or until a pre-determined period of time has lapsed without any further activity, before displaying the target program (step 418). If an interactive session had not been established, the target program would have been brought to the foreground of the TV screen 108 and displayed to the viewer 110.

The zap page 222 is transmitted out of the buffer 220 in response to an appear event message issued by the zap page interaction process to the buffer 220 and is subsequently displayed on the TV screen 108. The zap page interaction process then issues a render event message that instructs the processor 204 and a rendering process to render the back-up zap page 214 and store it in the buffer 220 (step 514). In order to maintain a back-up zap page 214 in the memory 210, the zap page interaction process issues a fetch event message to the network interface 202 that selects a new back-up zap page from the available zap pages transmitted by the server 102 and stores the selected zap page as a new back-up zap page in the memory 210 of the digital STB 106 (step 516). In this manner, the zap page 222 can be displayed to the viewer 110 substantially immediately upon receipt of a zap event. Additionally, future zap events can be supported in rapid succession by continuously rendering and displaying the back-up zap page 214 and reacquiring a new back-up zap page when the prior back-up zap page 214 has been rendered.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method, comprising:
periodically downloading from a server selected data sets according to user profile information, the selected data sets representing information elements for display to a user during switching events;
displaying a first one of the information elements in response to initiation of a first switching event, the first switching event being characterized by unavailability of information from the server for display; and
discontinuing the display of the first one of the information elements and displaying the data stream information from the server when it becomes available for such display, unless the user has initiated an interactive transaction session with a remote host by selecting an interactive element associated with the first one of the information elements in which case displaying the data stream information from the server is delayed until termination of the interactive transaction session or expiration of a predetermined period of inactivity by the user.

2. The method of claim 1, wherein downloading the selected data sets comprises storing the selected data sets in a buffer of a digital set top box.

3. The method of claim 2, wherein initiation of the first switching event comprises receiving at the digital set top box a signal from a television remote control device to switch channels.

4. The method of claim 1, wherein downloading the selected data sets comprises storing those of the selected data sets associated with the first information element in a buffer of a digital set top box and storing others of the selected data sets associated with others of the information elements in a memory of the digital set top box, wherein corresponding ones of the others of the selected data sets stored in the memory of the digital set top box replace those of the selected data sets in the buffer of the digital set top box once the first information element is displayed.

5. The method of claim 1, wherein the first information element comprises data associated with the data stream information from the server.

6. The method of claim 1, wherein the first information element comprises advertising data selected in accordance with the user profile information.

7. The method of claim 1, wherein downloading the selected data sets comprises storing the selected data sets in a digital set top box in which the user profile information is stored.

8. The method of claim 1, wherein the user profile information is stored at the server.

9. The method of claim 1, wherein the user profile information is stored in a data source accessible by the server.

10. The method of claim 9, wherein the data stream information is also stored in the data source.

11. The method of claim 1, wherein the remote host comprises an Internet host and the interactive transaction session comprises an electronic shopping transaction.

12. The method of claim 1, wherein the user profile information is based on one or more of: the user's television viewing habits, the user's purchasing habits, and the user's use of one or more television services.

13. The method of claim 1, wherein the information elements comprise one or more of: advertisement, information regarding the data stream information, information regarding a television program, information regarding a television channel, personal information regarding the user, a segment of the data stream information, or local or regional information.

14. A system, comprising:
- a server configured to provide a data stream transmission; and
- a digital set top box configured to (i) periodically download from the server selected data sets according to user profile information, the selected data sets being included within the data stream and representing information elements for display to a user during switching events; (ii) display a first one of the information elements in response to initiation of a first switching event, the first switching event being characterized by unavailability of information from the server for display; and (iii) discontinue the display of the first one of the information elements and displaying the data stream information from the server when it becomes available for such display, unless the user has initiated an interactive transaction session with a remote host by selecting an interactive element associated with the first one of the information elements in which case displaying the data stream information from the server is delayed until termination of the interactive transaction session or expiration of a predetermined period of inactivity by the user.

15. The system of claim 14, wherein the digital set top box includes both a buffer and a memory and is configured to store those of the selected data sets representing a first one of the information elements in the buffer and others of the selected data sets representing other information elements in the memory.

16. The system of claim 15, wherein the digital set top box is further configured to replace those of the selected data sets representing the first one of the information elements in the buffer with at least some of the others of the selected data sets representing other information elements in the memory after displaying the first information element.

17. The system of claim 14, wherein the digital set top box includes an interface configured to receive signals from a remote control unit, the signal representing initiation of the first switching event, which corresponds to changing channels.

18. The system of claim 14, wherein the information elements comprise one or more of: advertisement, information regarding the data stream information, information regarding a television program, information regarding a television channel, personal information regarding the user, a segment of the data stream information, or local or regional information.

19. The system of claim 14, wherein the digital set top box is further configured to store the user profile information.

20. The system of claim 14, wherein the server is further configured to store the user profile information.

21. The system of claim 14, further comprising a data store unit accessible by the server and configured to store the user profile information.

22. The system of claim 21, wherein the data store unit is further configured to store the data stream information.

* * * * *